(12) United States Patent
Mecker et al.

(10) Patent No.: US 11,370,277 B2
(45) Date of Patent: Jun. 28, 2022

(54) SUN VISOR ASSEMBLY INCLUDING AN ADD-ON SUN VISOR

(71) Applicants: Ilene Mecker, Deer Park, NY (US); Christopher Donnellan, Deer Park, NY (US)

(72) Inventors: Ilene Mecker, Deer Park, NY (US); Christopher Donnellan, Deer Park, NY (US)

( * ) Notice: Subject to any disclaimer, the term of this patent is extended or adjusted under 35 U.S.C. 154(b) by 0 days.

(21) Appl. No.: 17/506,933

(22) Filed: Oct. 21, 2021

(65) Prior Publication Data

US 2022/0126654 A1     Apr. 28, 2022

Related U.S. Application Data

(60) Provisional application No. 63/104,562, filed on Oct. 23, 2020.

(51) Int. Cl.
*B60J 3/02* (2006.01)

(52) U.S. Cl.
CPC .................... *B60J 3/0208* (2013.01)

(58) Field of Classification Search
CPC ........................................ B60J 3/0208
USPC .................. 296/97.6, 8, 11, 12, 13
See application file for complete search history.

(56) References Cited

U.S. PATENT DOCUMENTS

| | | | | |
|---|---|---|---|---|
| 5,580,117 A | * | 12/1996 | Goclowski | B60J 3/0208 296/97.9 |
| 5,626,381 A | * | 5/1997 | Gervasoni | B60J 3/0208 296/97.8 |
| 6,189,947 B1 | * | 2/2001 | Annan | B60J 3/0208 296/97.8 |
| 6,224,137 B1 | * | 5/2001 | Hunker | B60J 3/0208 24/562 |
| 6,899,371 B1 | * | 5/2005 | Hammond | B60J 3/0208 296/97.11 |

(Continued)

FOREIGN PATENT DOCUMENTS

| | | |
|---|---|---|
| CA | 1289165 C | 9/1991 |
| CN | 2897699 Y | 5/2007 |

(Continued)

OTHER PUBLICATIONS

Car Sun Visor Extender 360° Rotatable Sun Visor Sun Shade Protection from Sun Glare, Snow Blindness, UV Rays, Universal Fits Cars, SUVs and RVs: last visited Dec. 23, 2021 https://www.amazon.com/dp/B08BJJT2HY/.

*Primary Examiner* — Pinel E Romain
(74) *Attorney, Agent, or Firm* — Sean R. Wilsusen, Esq.; Carter, DeLuca & Farrell LLP

(57) ABSTRACT

A sun visor assembly includes a sun visor panel. A first arm extends from the sun visor panel. An attachment assembly is supported by the first arm. The first arm is rotatably coupled with the attachment assembly. The attachment assembly is configured to detachably connect with a second arm of a second sun visor panel. The attachment assembly includes a connection block. The connection block includes an orifice. A connection arm includes a projection at a first end of the connection arm. The projection is configured to releasably connect with the orifice of the connection block. A connection loop extends from a second end of the connection arm. The connection loop is configured to connect with the second arm of the second sun visor panel.

20 Claims, 12 Drawing Sheets

(56) References Cited

U.S. PATENT DOCUMENTS

| | | | |
|---|---|---|---|
| 7,537,263 B2* | 5/2009 | Delphia | ................ B60J 3/0278 |
| | | | 296/97.1 |
| 9,517,683 B2 | 12/2016 | Kim | |
| 2014/0284958 A1* | 9/2014 | Lin | ....................... B60J 3/0204 |
| | | | 296/97.1 |

FOREIGN PATENT DOCUMENTS

| | | |
|---|---|---|
| CN | 102795084 A | 11/2012 |
| CN | 204506436 U | 7/2015 |
| CN | 206493818 U | 9/2017 |

* cited by examiner

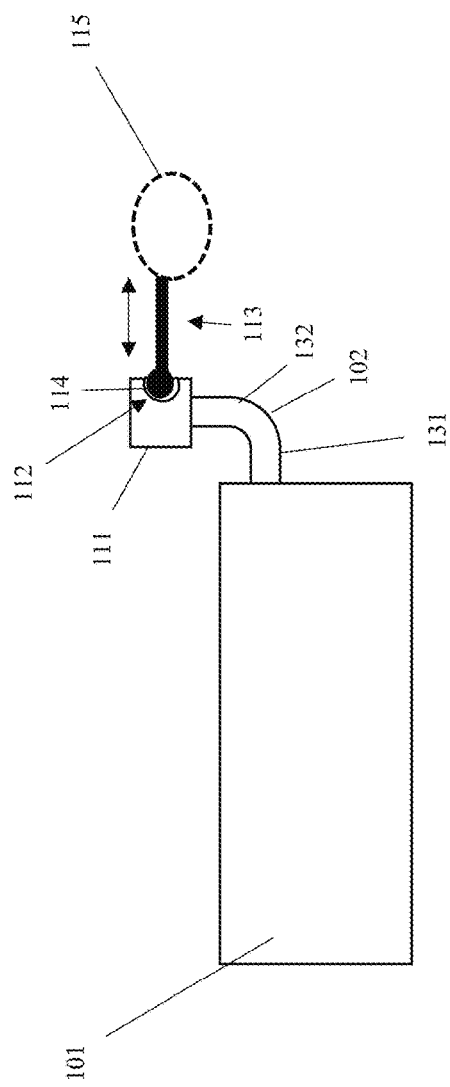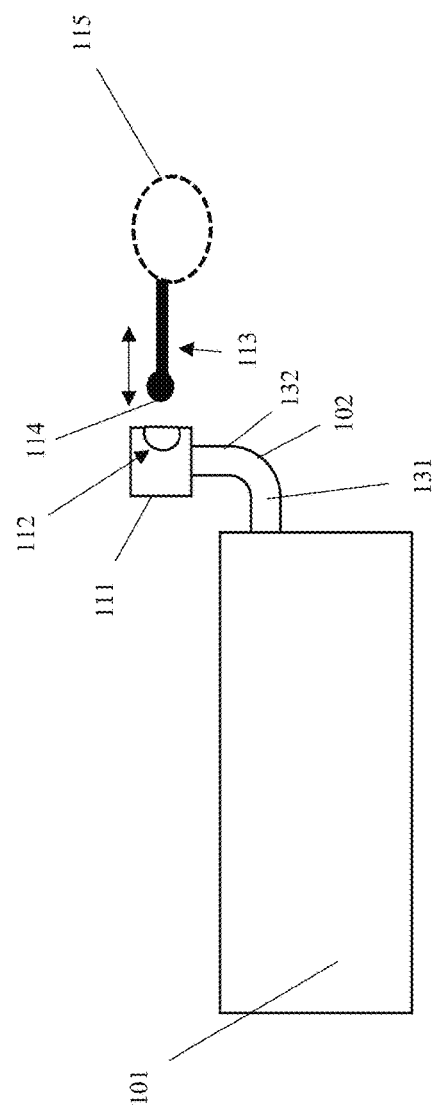

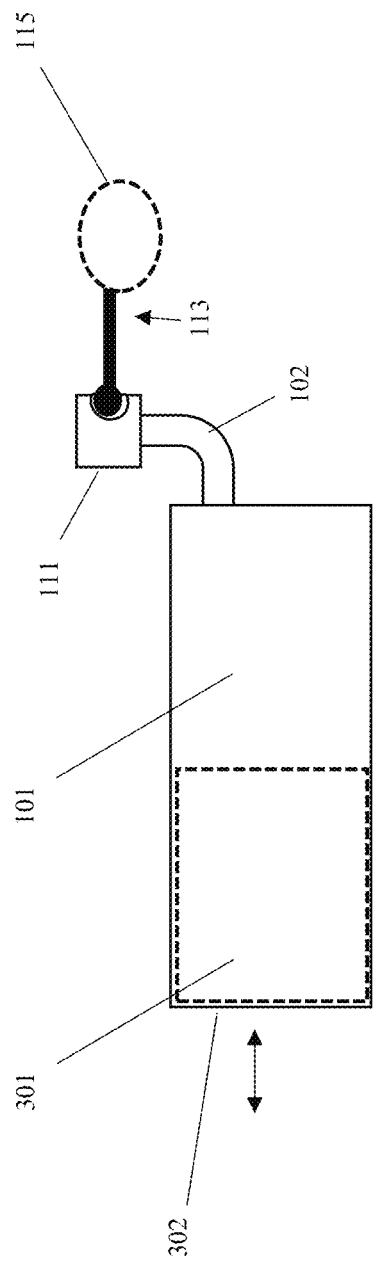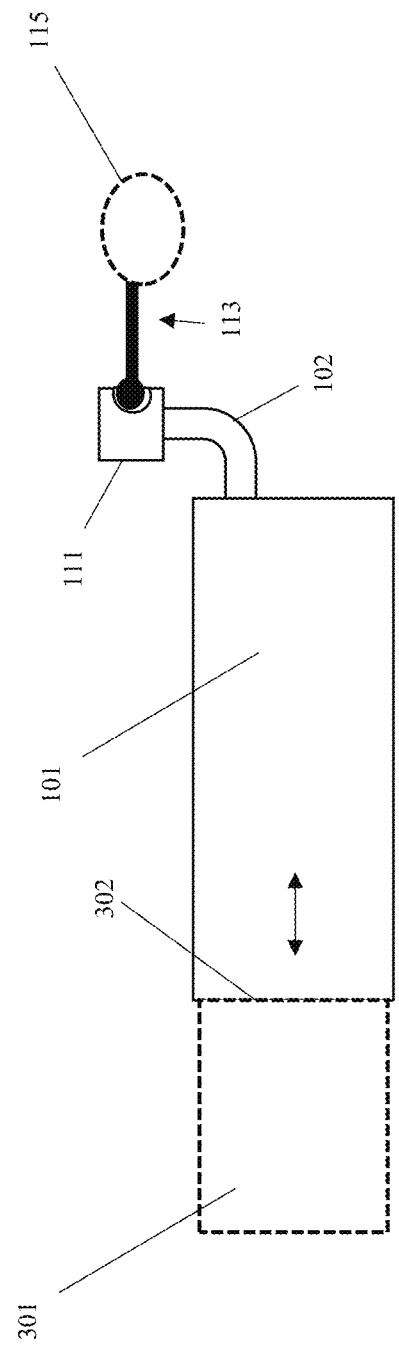
FIG. 3A
FIG. 3B

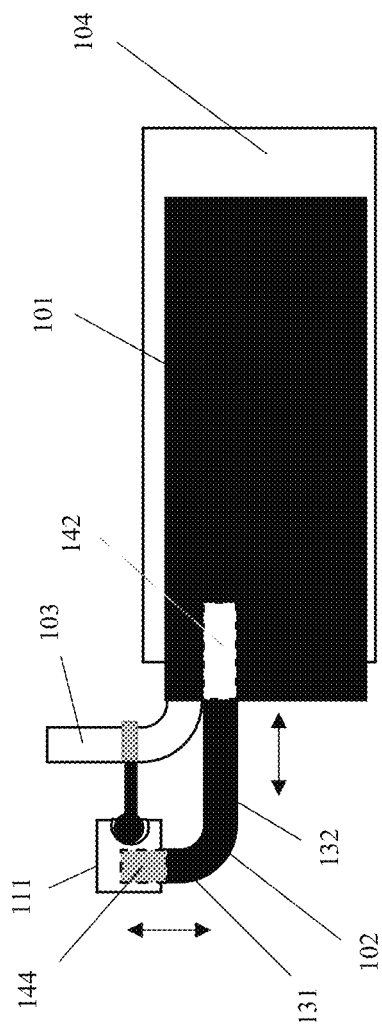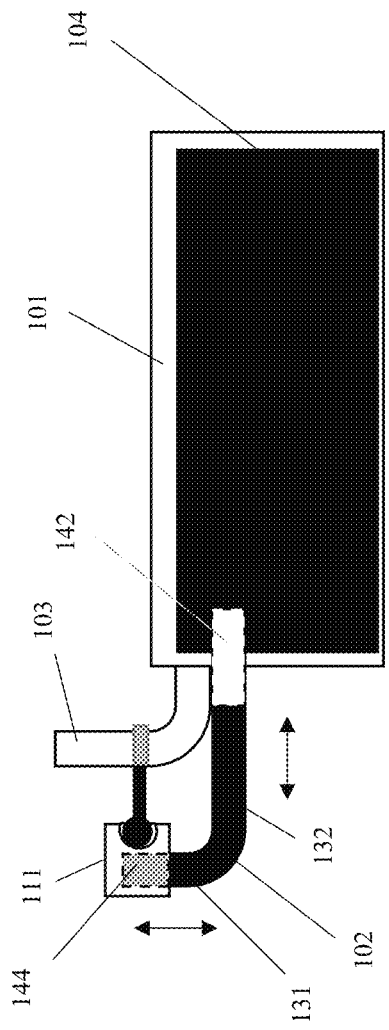
FIG. 5A
FIG. 5B

SUN VISOR ASSEMBLY INCLUDING AN ADD-ON SUN VISOR

CROSS-REFERENCE TO RELATED APPLICATION

This U.S. Non-Provisional Patent application claims priority to U.S. Provisional Patent Application No. 63/104,562, filed on Oct. 23, 2020, the disclosure of which is incorporated by reference in its entirety.

FIELD

The present disclosure relates to a sun visor assembly, and more particularly, to a sun visor assembly including an add-on sun visor suitable as an aftermarket product for a motorized vehicle such as a car, truck, or van.

BACKGROUND

Generally, factory provided sun visors in vehicles provide only one of front or side sun protection for a vehicle operator. For example, a factory provided sun visor may be adjusted to provide shade in a side window, but not the front windshield. However, vehicles traveling at an angle to the sun, or on a curved road may need to frequently adjust the factory provided sun visor from the front-facing or side-facing position to account for various angles of the vehicle with respect to the sun.

SUMMARY

Provided in accordance with aspects of the present disclosure is a sun visor assembly including a sun visor panel. A first arm extends from the sun visor panel. An attachment assembly is supported by the first arm. The first arm is rotatably coupled with the attachment assembly. The attachment assembly is configured to detachably connect with a second arm of a second sun visor panel. The attachment assembly includes a connection block. The connection block includes an orifice. A connection arm includes a projection at a first end of the connection arm. The projection is configured to releasably connect with the orifice of the connection block. A connection loop extends from a second end of the connection arm. The connection loop is configured to connect with the second arm of the second sun visor panel.

In an aspect of the present disclosure, the projection of the connection arm releasably connects with the orifice of the connection block by a snap-fit connection.

In an aspect of the present disclosure, the projection of the connection arm is an annular cantilever snap joint. The orifice of the connection block is shaped and dimensioned to receive the annular cantilever snap joint.

In an aspect of the present disclosure, the projection of the connection arm is a discontinuous annular cantilever snap joint. The orifice of the connection block is shaped and dimensioned to receive the discontinuous annular cantilever snap joint.

In an aspect of the present disclosure, the projection of the connection arm is shaped as a ball. The orifice of the connection block is socket shaped and dimensioned to releasably receive the ball.

In an aspect of the present disclosure, the first arm has a bent shape including a horizontal extending portion and a vertical extending portion. The connection block is supported by the vertical extending portion.

In an aspect of the present disclosure, the sun visor panel is horizontally translatable along the horizontal extending portion of the first arm. The horizontal extending portion of the first arm includes an extension portion configured to allow horizontal translation of the sun visor panel. The extension portion is at least partially positioned between a front surface and a rear surface of the sun visor panel.

In an aspect of the present disclosure, an extension panel is slidably extendable from a distal end of the sun visor panel to extend a length of the sun visor panel.

In an aspect of the present disclosure, a hinge connects the extension panel to a distal end of the sun visor panel. The hinge is configured to allow the extension panel to fold away from the sun visor panel to extend a length of the sun visor panel. The hinge may be a butt hinge, a mortise hinge, a continuous hinge, or a piano hinge.

In an aspect of the present disclosure, the connection loop is an adjustable ring configured to be circumferentially coupled about the second arm of the second sun visor panel. The adjustable ring includes a rubber ring configured to directly contact the second arm of the second sun visor panel. An adjustable metal ring is positioned around the rubber ring. The adjustable metal ring is configured to be tightened around the rubber ring to secure the adjustable ring to the second arm of the second sun visor panel.

In an aspect of the present disclosure, the sun visor panel includes an inner layer including plastic or a polymer, and an outer layer including a fabric material covering the inner layer.

In an aspect of the present disclosure, the first arm includes metal.

In an aspect of the present disclosure, the connection arm and the projection are a single integrally formed structure.

In an aspect of the present disclosure, the connection block includes a plastic material or a polymer material.

In an aspect of the present disclosure, the second end of the connection arm is narrower in at least one direction than the first end of the connection arm.

In an aspect of the present disclosure, a magnet is supported on the sun visor panel. The magnet is configured to magnetically secure the sun visor panel to an upper surface of a vehicle.

BRIEF DESCRIPTION OF THE DRAWINGS

Various aspects and features of the present disclosure are described hereinbelow with reference to the drawings wherein:

FIG. 2A is a rear view of the sun visor assembly with a connection arm releasably connected with a connection block;

FIG. 2B is a rear view of the sun visor assembly with the connection arm disconnected from the connection block;

FIG. 3A is a rear view of the sun visor assembly including a sliding extension panel of the sun visor panel in a retracted configuration;

FIG. 3B is a rear view of the sun visor assembly with the sliding extension panel in an extended configuration;

FIG. 5A is a rear view of a horizontally translatable sun visor panel in a first horizontal position;

FIG. 5B is a rear view of the horizontally translatable sun visor panel in a second horizontal position that is aligned with a second sun visor panel;

DETAILED DESCRIPTION

Figure 1:
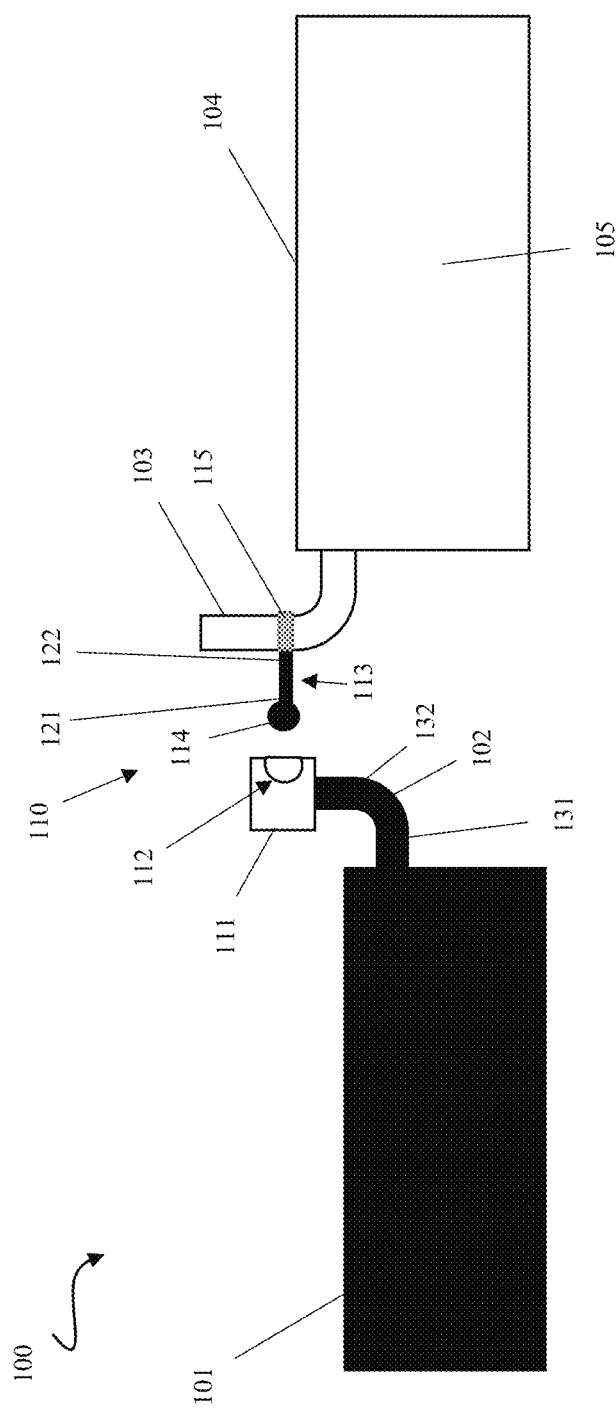
FIG. 1 is a rear view of a sun visor assembly according to aspects of the present disclosure.

The terms "about," substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

FIG. 1 is a rear view of a sun visor assembly 100. FIG. 2A is a rear view of the sun visor assembly 100 with a connection arm releasably connected with a connection block. FIG. 2B is a rear view of the sun visor assembly 100 with the connection arm disconnected from the connection block.

Referring to FIGS. 1, 2A, and 2B, the sun visor assembly 100 includes a sun visor panel 101. A first arm 102 extends from the sun visor panel 101. An attachment assembly 110 is supported by the first arm 102. The first arm 102 is rotatably coupled with the attachment assembly 110. Thus, the sun visor panel 101 may be rotated to a side of a motor vehicle to block sun through a side window of the motor vehicle. The sun visor panel 101 may also be folded against a factory provided sun visor panel (e.g., second sun visor panel 104) and folded against a ceiling of a vehicle along with the factory provided sun visor panel 104. When the sun visor panel 101 and the factory provided sun visor panel 104 are both deployed, two distinct sun visor panels are employed to simultaneously block the sun through side and front windows, respectively, of a vehicle. The sun visor assembly 100 may be used as an after market or add-on product, and is adapted to be connected with a factory installed sun visor panel that is generally only useful to block sun through one of the front windshield or a side window of a motor vehicle.

The attachment assembly 110 is configured to detachably connect with a second arm 103 of a second sun visor panel 104. The attachment assembly 110 includes a connection block 111. The connection block 111 includes an orifice 112. A connection arm 113 includes a projection 114 at a first end 121 of the connection arm 113. The projection 114 is configured to releasably connect with the orifice 112 of the connection block 111. A connection loop 115 extends from a second end 122 of the connection arm 113. The connection loop 115 is configured to releasably connect with the second arm 103 of the second sun visor panel 104.

In an aspect of the present disclosure, the first arm 102 has a bent shape including a horizontal extending portion 131 and a vertical extending portion 132. The connection block 111 is supported by the vertical extending portion 132.

FIG. 3A is a rear view of the sun visor assembly 100 including a sliding extension panel 301 of the sun visor panel 101 in a retracted configuration. FIG. 3B is a rear view of the sun visor assembly 100 with the sliding extension panel 301 in an extended configuration.

Referring to FIGS. 3A and 3B, the extension panel 301 is slidably extendable from a distal end 302 of the sun visor panel 101 to extend a length of the sun visor panel 101. Thus, the sun visor panel 101 may be extended to various lengths to accommodate windows of various sizes, for drivers of various sizes, and for various driving conditions in which the sun is positioned at different angles with respect to a vehicle.

Figure 4A:
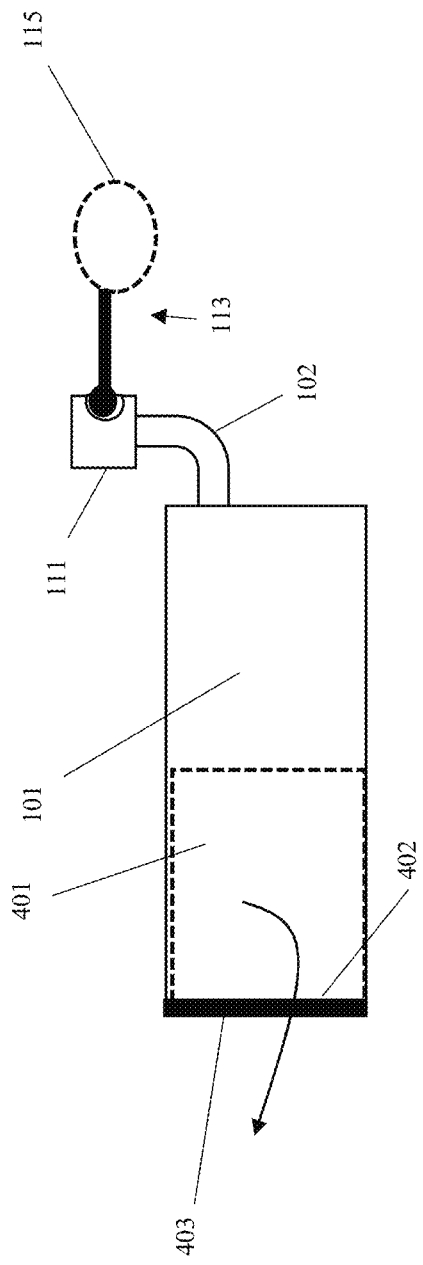
FIG. 4A is a rear view of the sun visor assembly including a folding extension panel of the sun visor panel in a collapsed configuration.
Figure 4B:
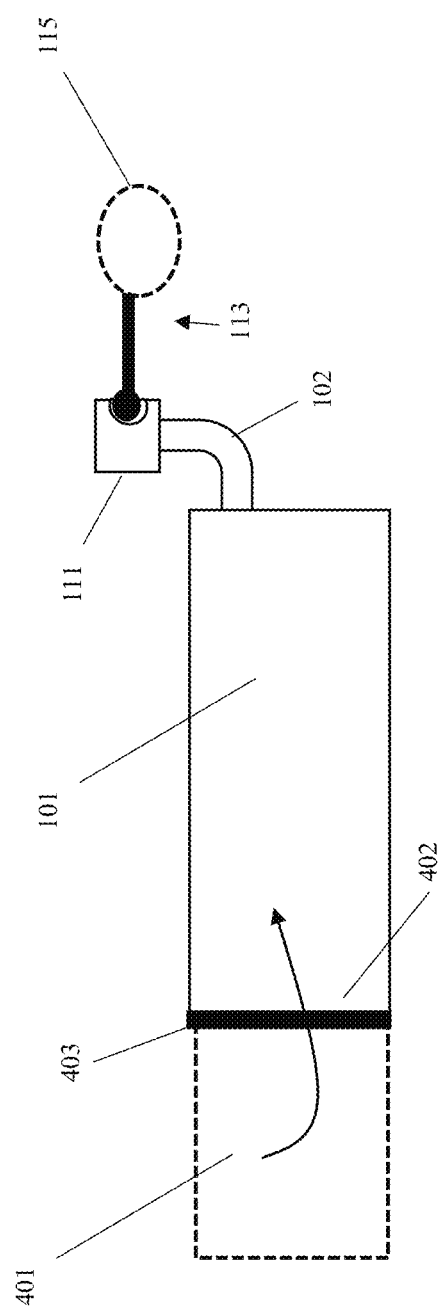
FIG. 4B is a rear view of the sun visor assembly including the folding extension panel of the sun visor panel in a deployed configuration.

FIG. 4A is a rear view of the sun visor assembly 100 including a folding extension panel 401 of the sun visor panel 101 in a collapsed configuration. FIG. 4B is a rear view of the sun visor assembly 100 including the folding extension panel 401 of the sun visor panel 101 in a deployed configuration.

Referring to FIGS. 4A and 4B, a hinge 403 connects the folding extension panel 401 to a distal end 402 of the sun visor panel 101. The hinge 403 is configured to allow the folding extension panel 401 to fold away from the sun visor panel 101 to extend a length of the sun visor panel 401. Thus, the sun visor panel 101 may be extended to various lengths to accommodate windows of various sizes, for drivers of various sizes, and for various driving conditions in which the sun is positioned at different angles with respect to a vehicle. The hinge 403 may be a butt hinge, a mortise hinge, a continuous hinge, or a piano hinge.

FIG. 5A is a rear view of a horizontally translatable sun visor panel 101 in a first horizontal position. FIG. 5B is a rear view of the horizontally translatable sun visor panel 101 in a second horizontal position that is aligned with the second sun visor panel 104.

Referring to FIGS. 5A and 5B, the sun visor panel 101 is horizontally translatable along the horizontal extending portion 132 of the first arm 102. The horizontal extending portion 132 of the first arm 102 includes an extension portion 142 configured to allow horizontal translation of the sun visor panel 101. The extension portion 142 may be at least partially positioned between a front surface (not shown) and a rear surface 105 of the sun visor panel. The vertical extending portion 131 of the first arm 102 may also include a vertical extension portion 144 at least partially extending within the connection block 111. The vertical extension portion 144 allows vertical translation of the sun visor panel 101 by vertically advancing the vertical extension portion 144 within the connection block 111 and thereby vertically advancing the first arm 102 and the sun visor panel 101. Thus, the vertical and horizontal positions of the sun visor panel 101 may be adjusted, as desired, either when the sun visor panel 101 is in use, or when the sun visor panel 101 is stowed away (e.g., when folded against a ceiling of a motorized vehicle along with the second sun visor panel 104). As illustrated, e.g., in FIGS. 5A and 5B, the sun visor panel 101 we be vertically and/or horizontally aligned with and positioned in direct contact with the second sun visor panel 104, as desired (e.g., when the second sun visor panel 104 is in use, or when the second sun visor panel 104 is folded against a ceiling of a motorized vehicle).

Referring again generally to FIGS. 1, 2A, and 2B, the projection 114 of the connection arm 113 releasably connects with the orifice 112 of the connection block 111 by a snap-fit connection. A number of exemplary snap-fit connections are described in more detail below with reference to FIGS. 6 and 7.

Figure 6:
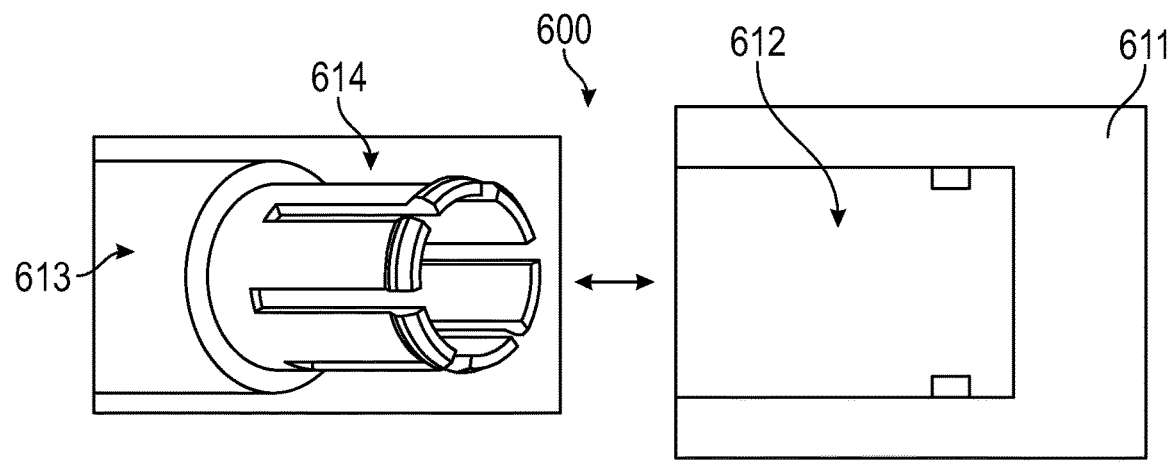
FIG. 6 illustrates an exemplary cantilever snap joint configured to releasably connect the connection arm with the connection block.

FIG. 6 illustrates an exemplary cantilever snap joint 600 configured to releasably connect the connection arm 613 with the connection block 611.

Referring to FIG. 6, the projection 614 of the connection arm 613 is an annular cantilever snap joint. The orifice 612 of the connection block 611 is shaped and dimensioned to receive the annular cantilever snap joint 614. In an aspect of the present disclosure, the projection 614 of the connection arm 613 is a discontinuous annular cantilever snap joint including a plurality of cantilever arms annularly spaced apart from each other. The orifice 612 of the connection block 611 is shaped and dimensioned to receive the discontinuous annular cantilever snap joint 614.

Figure 7:
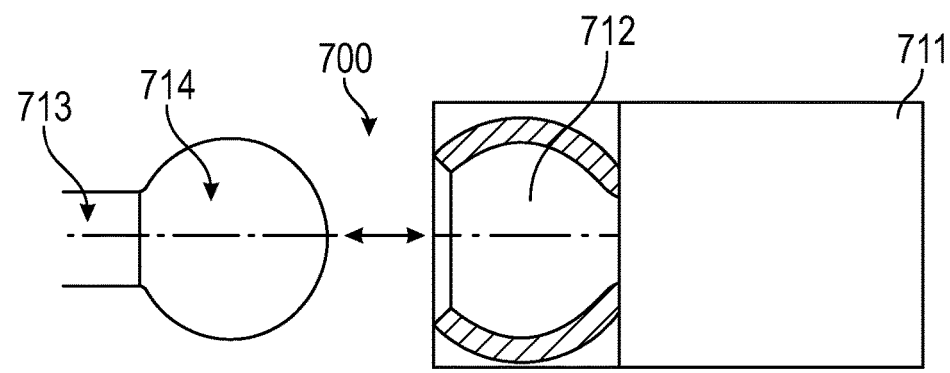
FIG. 7 illustrates an exemplary ball and socket joint configured to releasably connect the connection arm with the connection block.

FIG. 7 illustrates an exemplary ball and socket joint 700 configured to releasably connect the connection arm 713 with the connection block 711.

Referring to FIG. 7, the projection 714 of the connection arm 713 is shaped as a ball. The orifice 712 of the connection block 711 is a socket shaped and dimensioned to releasably receive the ball 714.

Figure 8:
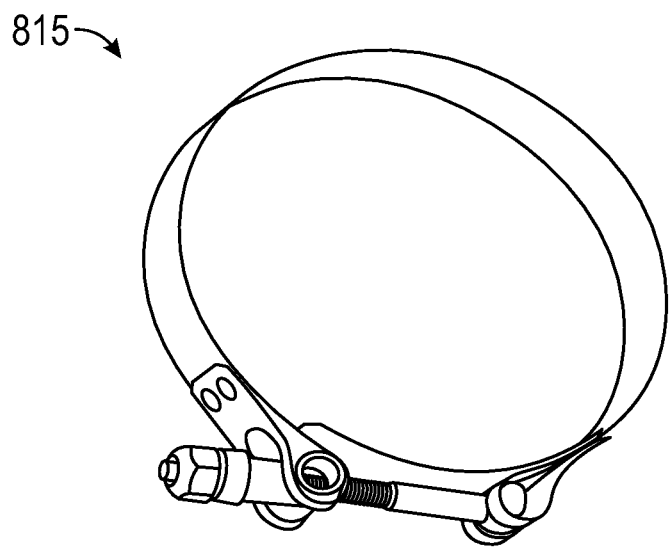
FIG. 8 illustrates an exemplary connection loop configured to be circumferentially coupled about a second arm of a second sun visor panel.

FIG. 8 illustrates an exemplary connection loop 815 configured to be circumferentially coupled about the second arm 103 of a second sun visor panel 104.

Referring to FIG. 8, the connection loop 815 is an adjustable ring configured to be circumferentially coupled about the second arm 103 of the second sun visor panel 104.

Figure 9:
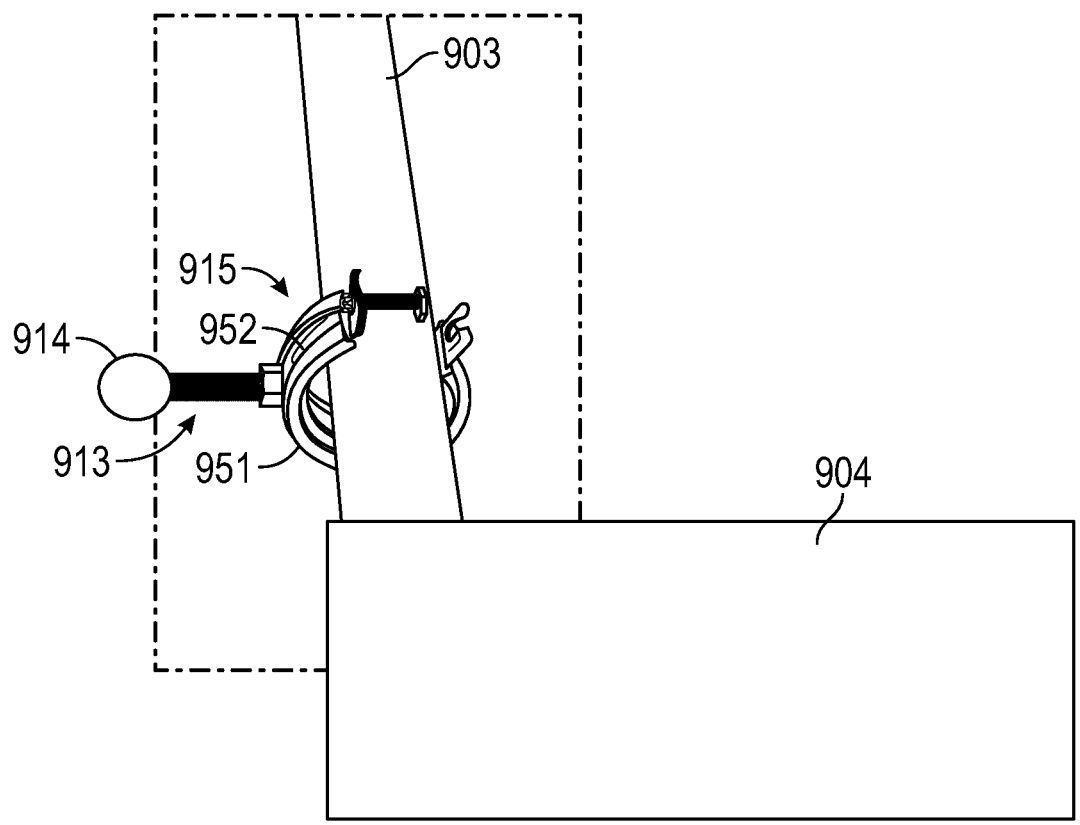
FIG. 9 illustrates an exemplary connection loop coupled to a second arm of a second sun visor panel.

FIG. 9 illustrates an exemplary connection loop 915 coupled to a second arm 903 of a second sun visor panel 904. Unless otherwise indicated, the second arm 103 is the substantially the same as the second arm 903, and the second sun visor panel 104 is substantially the same as the second sun visor panel 904.

Referring to FIG. 9, the adjustable ring 915 includes a rubber ring 951 configured to directly contact the second arm 903 of the second sun visor panel 904. An adjustable metal ring 952 is positioned around the rubber ring 951. The adjustable metal ring 952 is configured to be tightened around the rubber ring 951 to secure the adjustable ring 915 to the second arm 903 of the second sun visor panel 904.

Figure 10:
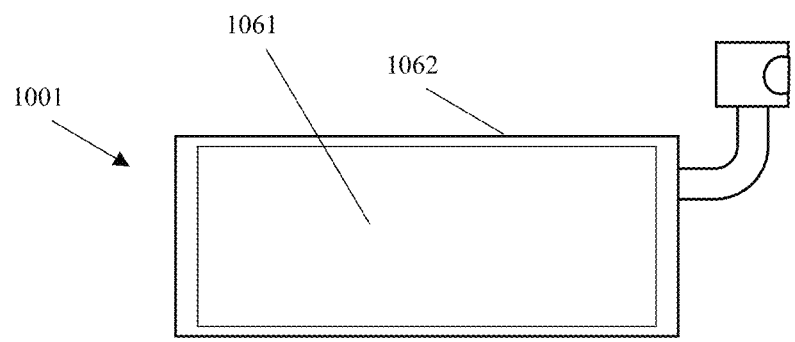
FIG. 10 is an interior view of a sun visor panel according to aspects of the present disclosure.

FIG. 10 is an interior view of a sun visor panel 1001 according to aspects of the present disclosure.

Referring to FIG. 10, the sun visor panel 1001 includes an inner layer 1061 including plastic or a polymer, and an outer layer 1062 including a fabric material covering the inner layer 1001.

In an aspect of the present disclosure, the first arm 102 includes metal.

In an aspect of the present disclosure, the connection arm 113 and the projection 114 are a single integrally formed structure.

In an aspect of the present disclosure, the connection block 111 includes a plastic material or a polymer material.

Figure 11:
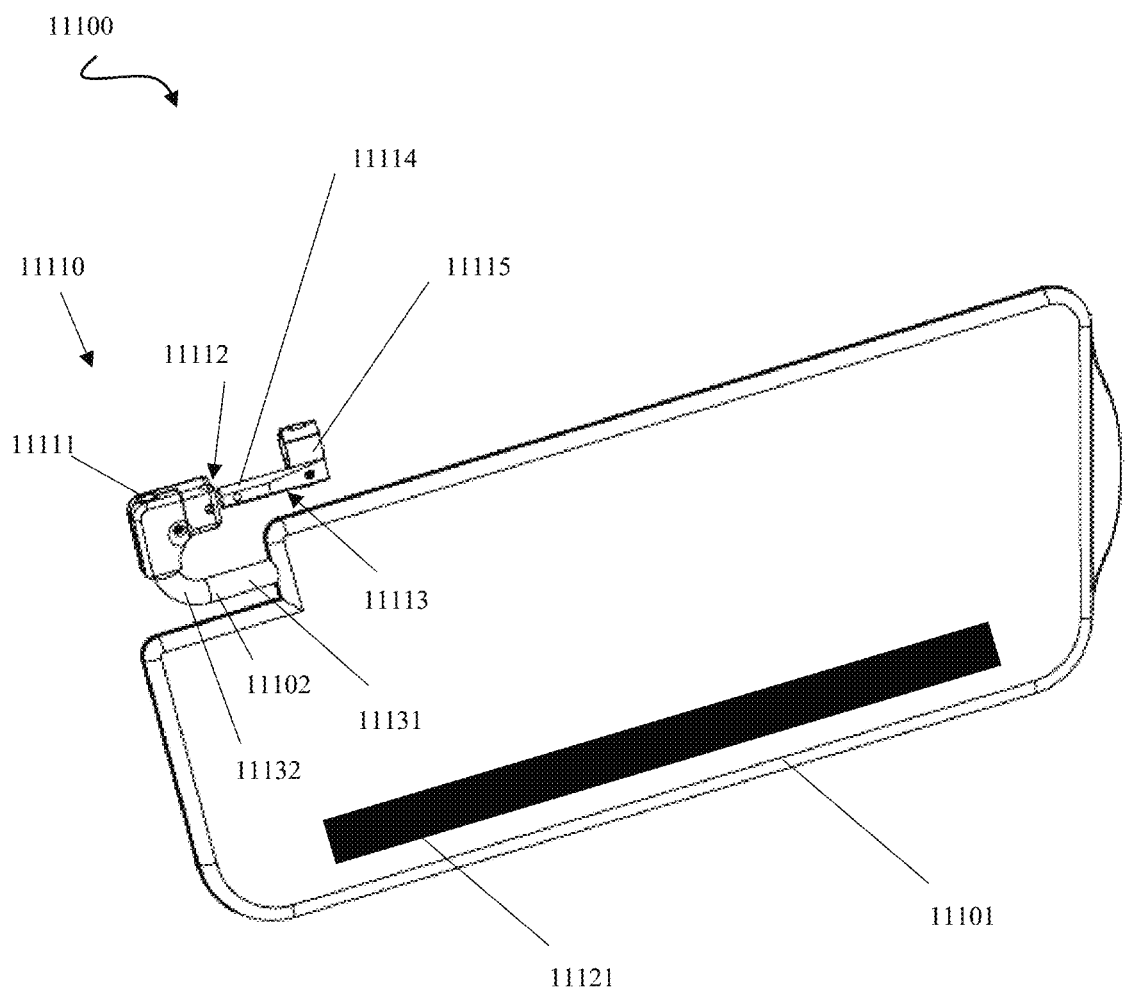
FIG. 11 is a front, perspective view of a sun visor assembly according to aspects of the present disclosure.
Figure 12:
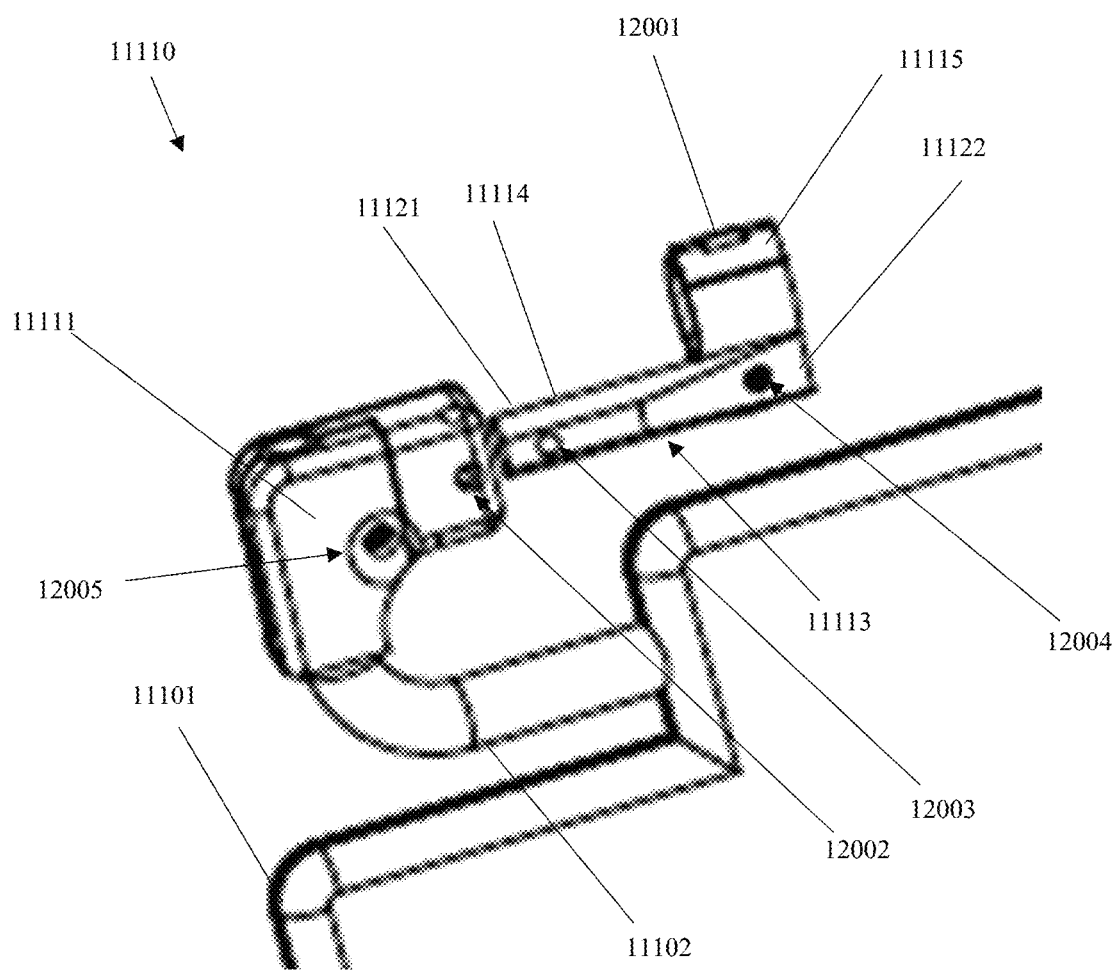
FIG. 12 is an enlarged, perspective view of the attachment assembly of FIG. 11.
Figure 13:
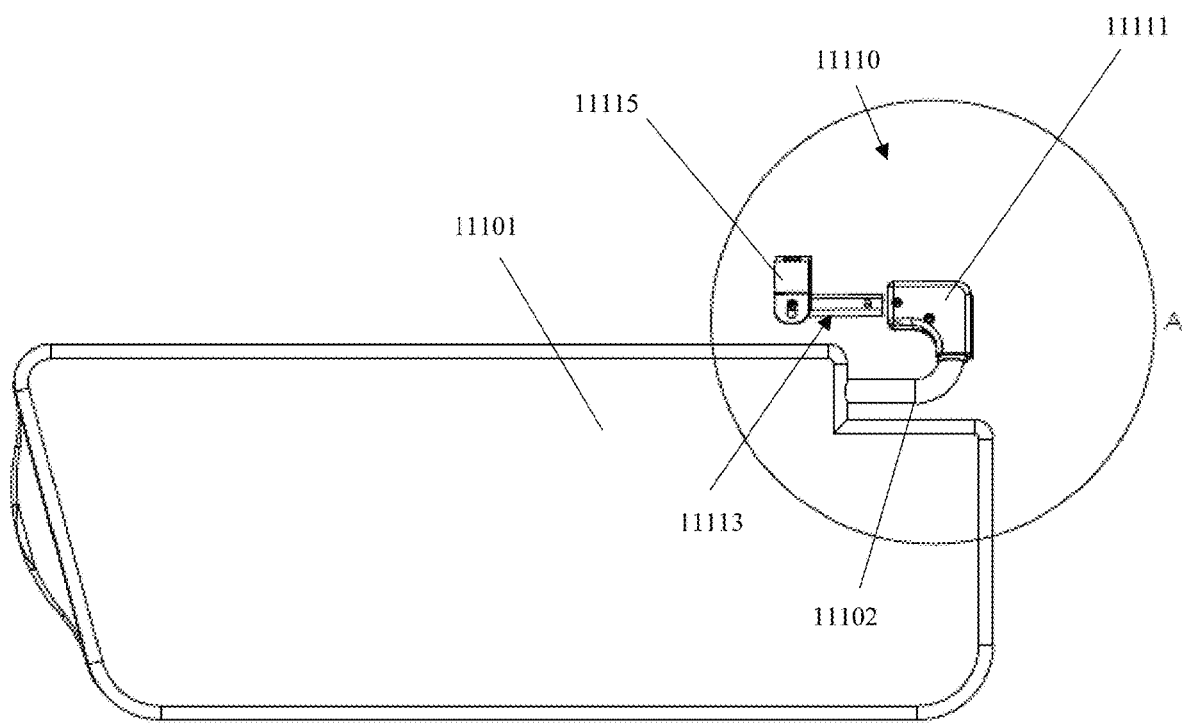
FIG. 13 is rear view of the sun visor panel of FIG. 11.
Figure 14:
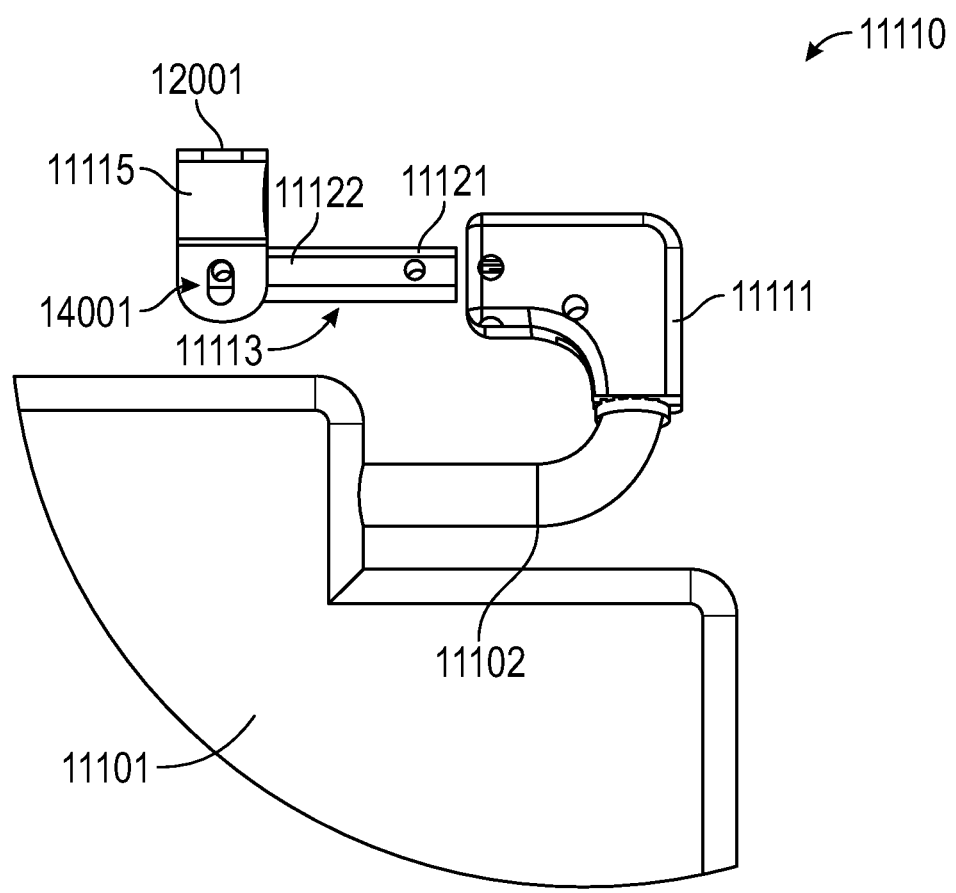
FIG. 14 is an enlarged view of area A of FIG. 13.

FIG. 11 is a front, perspective view of a sun visor assembly 11100 according to aspects of the present disclosure. FIG. 12 is an enlarged, perspective view of an attachment assembly 11110 of FIG. 11. FIG. 13 is rear view of the sun visor assembly 11100 of FIG. 11. FIG. 14 is an enlarged view of area A of FIG. 13.

Referring to FIGS. 11-14, the sun visor assembly 11100 includes a sun visor panel 11101. A first arm 11102 extends from the sun visor panel 11101. An attachment assembly 11110 is supported by the first arm 11102. The first arm 11102 is rotatably coupled with the attachment assembly 11110. Thus, the sun visor panel 11101 may be rotated to a side of a motor vehicle to block sun through a side window of the motor vehicle. The sun visor panel 11101 may also be folded against a factory provided sun visor panel (e.g., second sun visor panel 104) and folded against a ceiling of a vehicle along with the factory provided sun visor panel 104. When the sun visor panel 11101 and the factory provided sun visor panel 104 are both deployed, two distinct sun visor panels are employed to simultaneously block the sun through side and front windows, respectively, of a vehicle. The sun visor assembly 11100 may be used as an after market or add-on product, and is adapted to be connected with a factory installed sun visor panel that is generally only useful to block sun through one of the front windshield or a side window of a motor vehicle.

The attachment assembly 11110 is configured to detachably connect with a second arm 103 of a second sun visor panel 104. The attachment assembly 11110 includes a connection block 11111. The connection block 11111 includes an orifice 11112. A connection arm 11113 includes a projection 11114 at a first end 11121 of the connection arm 11113. The projection 11114 is configured to releasably connect with the orifice 11112 of the connection block 11111 (e.g., by removably connecting a pin or screw into orifice 12002 of connection block 11111 and into orifice 12003 of the projection 11114—see, e.g., FIG. 12). A connection loop 11115 extends from a second end 11122 of the connection arm 11113. The connection loop 11115 is configured to releasably connect with the second arm 103 of the second sun visor panel 104.

In an aspect of the present disclosure, the second end 11122 of connection arm 11113 may be removably coupled with connection loop 11115 by removably securing a pin or screw in orifice 12004 (see, e.g., FIG. 12). Alternatively, the second end 11122 of connection arm 11113 may be fixedly coupled with (e.g., welded to or integrally formed with) connection loop 11115.

Connection block 11111 may be removably coupled with arm 11102 by removably securing a pin or screw in orifice 12005 (see, e.g., FIG. 12).

In an aspect of the present disclosure, the first arm 102 has a bent shape including a horizontal extending portion 131 and a vertical extending portion 132. The connection block 111 is supported by the vertical extending portion 132.

In an aspect of the present disclosure, the second end 11122 of the connection arm 11113 is narrower in at least one direction than the first end 11121 of the connection arm 11112. For example, the second end 11122 of the connection arm 11113 may define a tapered configuration. In use, this allows a factory installed sun visor to rotate freely without contacting the second end 11122 of the connection arm 11113. The connection arm 11113 (e.g., at least the first end 11121 of the connection arm 11113) may define an octagonal, hexagonal or square cross-sectional shape along at least a portion of a length thereof, which is configured to mate with a corresponding shape of orifice 11112 of connection block 11111. The second end 11122 of the connection arm 11113 may have a different cross-sectional shape from a shape of the first end 11121 of the connection arm 11113. As an example, the first end 11121 of the connection arm 11113 may define a semi-circular shape or cylindrical shape.

In an aspect of the present disclosure, a magnet 11121 is supported on the sun visor panel 11101. The magnet 11121 is configured to magnetically secure the sun visor panel 11101 to an upper surface of a vehicle. The magnet 11121 may be a single strip magnet, or a plurality of individual magnets arranged in the sun visor panel 11101. As an example, the magnet 11121 may be a neodymium magnet. The magnet 11121 may be arranged on a single side of the sun visor panel 11101 or both sides of the sun visor panel 11101 (e.g., to magnetically couple the sun visor panel 11101 to factory sun visor panel 104.

The connection loop 11115 may include a hinge 12001 (see, e.g., FIG. 12) that allows the connection loop 11115 to open and close for attachment with an arm of a vehicle. The connection loop 11115 may be secured in a closed position by removably attaching a pin our screw through aperture 14001 (see, e.g., FIG. 14). As an example, orifice 12004 may be in communication with aperture 14001.

As an example, the pins described herein may be cottar pins, split pins or cotter keys.

As an example, each of the connection loop 11115 and connection arm 11113 may be formed of or may include a metal such as steel or stainless steel.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A sun visor assembly, comprising:
   a sun visor panel;
   a first arm extending from the sun visor panel; and
   an attachment assembly supported by the first arm, the first arm rotatably coupled with the attachment assembly, the attachment assembly configured to detachably connect with a second arm of a second sun visor panel, the attachment assembly including:
      a connection block defining an orifice therein;
      a connection arm including a projection at a first end of the connection arm, the projection configured to releasably connect with the orifice of the connection block; and
      a connection loop extending from a second end of the connection arm, the connection loop configured to connect with the second arm of the second sun visor panel.

2. The sun visor assembly of claim 1, wherein the projection of the connection arm releasably connects with the orifice of the connection block by a snap-fit connection.

3. The sun visor assembly of claim 1, wherein the projection of the connection arm is an annular cantilever snap joint, and wherein the orifice of the connection block is shaped and dimensioned to receive the annular cantilever snap joint.

4. The sun visor assembly of claim 1, wherein the projection of the connection arm is a discontinuous annular cantilever snap joint, and wherein the orifice of the connection block is shaped and dimensioned to receive the discontinuous annular cantilever snap joint.

5. The sun visor assembly of claim 1, wherein the projection of the connection arm is shaped as a ball, and wherein the orifice of the connection block is a socket shaped and dimensioned to releasably receive the ball.

6. The sun visor assembly of claim 1, further including the first arm having a bent configuration including a horizontal extending portion and a vertical extending portion, wherein the connection block is supported by the vertical extending portion.

7. The sun visor assembly of claim 1, wherein the sun visor panel is horizontally translatable along the horizontal extending portion of the first arm.

8. The sun visor assembly of claim 7, wherein the horizontal extending portion of the first arm includes an extension portion configured to allow horizontal translation of the sun visor panel.

9. The sun visor assembly of claim 8, wherein the extension portion is at least partially positioned between a front surface and a rear surface of the sun visor panel.

10. The sun visor assembly of claim 1, further including an extension panel, wherein the extension panel is slidably extendable from a distal end of the sun visor panel to extend a length of the sun visor panel.

11. The sun visor assembly of claim 1, further including an extension panel and a hinge connecting the extension panel to a distal end of the sun visor panel, the hinge configured to allow the extension panel to fold away from the sun visor panel to extend a length of the sun visor panel.

12. The sun visor assembly of claim 11, wherein the hinge is a butt hinge, a mortise hinge, a continuous hinge, or a piano hinge.

13. The sun visor assembly of claim 1, wherein the connection loop is an adjustable ring configured to be circumferentially coupled about the second arm of the second sun visor panel.

14. The sun visor assembly of claim 13, wherein the adjustable ring includes a rubber ring configured to directly contact the second arm of the second sun visor panel, and an adjustable metal ring positioned around the rubber ring, the adjustable metal ring configured to be tightened around the rubber ring to secure the adjustable ring to the second arm of the second sun visor panel.

15. The sun visor assembly of claim 1, wherein the sun visor panel includes an inner layer including plastic or a polymer, and an outer layer including a fabric material covering the inner layer.

16. The sun visor assembly of claim 1, wherein the first arm includes metal.

17. The sun visor assembly of claim 1, wherein the connection arm and the projection are a single integrally formed structure.

18. The sun visor assembly of claim 1, wherein the connection block includes a plastic material or a polymer material.

19. The sun visor assembly of claim 1, wherein the second end of the connection arm is narrower in at least one direction than the first end of the connection arm.

20. The sun visor assembly of claim 1, further including at least one magnet supported on the sun visor panel, the at least one magnet configured to magnetically secure the sun visor panel to an upper surface of a vehicle.

\* \* \* \* \*